Aug. 9, 1960     A. J. EVANS     2,948,041
EAR CLIP COMPONENT
Filed Oct. 15, 1957
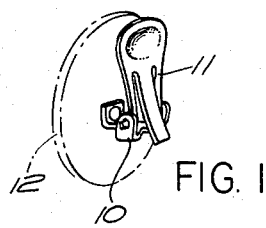
FIG. 1
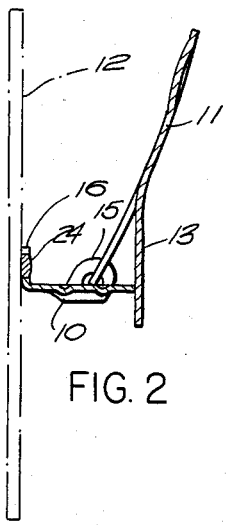
FIG. 2
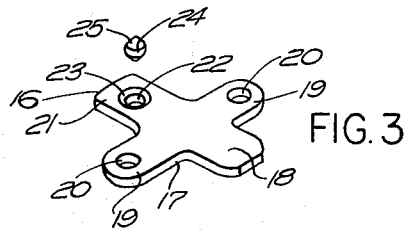
FIG. 3
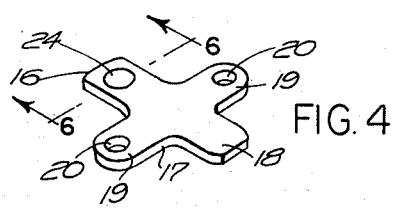
FIG. 4
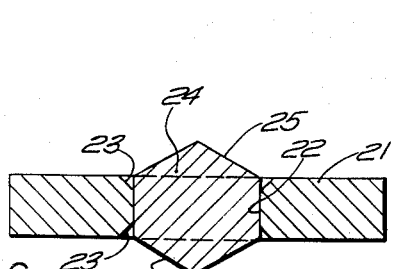
FIG. 5
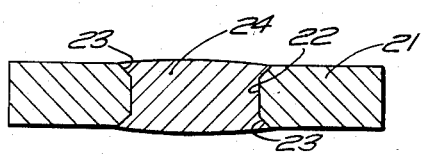
FIG. 6
FIG. 7
*INVENTOR.*
ANDREW J. EVANS
BY
ATTORNEY

United States Patent Office 2,948,041
Patented Aug. 9, 1960

2,948,041

EAR CLIP COMPONENT

Andrew J. Evans, Greenville, R.I., assignor to E. A. Adams & Son, Inc., Providence, R.I., a corporation of Rhode Island Filed Oct. 15, 1957, Ser. No. 690,345

1 Claim. (Cl. 24—252)

My present invention relates to the jewelry art and more particularly to a jewelry finding such as an ear clip and the attachment of such finding to an ornament or other part with which it is assembled.

The principal object of the present invention is to provide a jewelry finding in which the solder is incorporated in the finding.

Another object of the present invention is to provide an ear clip having the solder locked to the clip in such manner as to permit automatic manufacture and assembly.

With the above and other objects and advantageous features in view, my invention consists of a novel arrangement of parts more fully disclosed in the detailed description following, in conjunction with the accompanying drawings, and more particularly defined in the appended claim.

In the drawings,

Fig. 1 is a perspective view of an earring showing an ear clip made in accordance with the present invention.

Fig. 2 is an enlarged vertical section of the ear clip in open position.

Fig. 3 is an exploded view showing the blank for forming the ear clip base and the solder to be inserted.

Fig. 4 is a view similar to Fig. 3 with the solder in place.

Fig. 5 is a perspective view of the finished base.

Fig. 6 is an enlarged section taken on line 6—6 on Fig. 4 before the final compression of the solder.

Fig. 7 is a view similar to Fig. 6 after the completion of the assembly.

In joining an ear clip to the back of a jewelry ornament to form an earring, a small base area is provided to which solder is applied to form the attachment. A great deal of skill is required to properly align the parts, add the solder and apply the heat. Excess solder makes for a clumsy joint. In any event the soldering of the parts involves a costly operation which adds materially to the cost of the finished product. The present invention is designed to provide an ear clip base having a correct amount of solder incorporated in and fixed to the base in such manner that the subsequent soldering operation is easy to perform and will always be uniform without excess solder. Furthermore, the construction of the present invention is so designed that the solder can be incorporated automatically during the stamping and forming operation of the base.

Referring more in detail to the drawings, Figs. 1 and 2 show the construction of the ear clip. A base 10 is provided with a spring clip 11 which is hinged to it. The base 10 is soldered to the back of the jewelry ornament 12 so that the ear lobe can be clamped between the clip 11 and the ornament 12. This is a conventional construction. Pressure is provided by a spring element 13 formed integrally with the clip 11 and riding over the rear edge of the base 10. As can be seen in Figs. 2 and 5, the base 10 comprises an elongated portion 14 having integral upstanding ears 15 on each side into which the member 11 is pivoted. The front end of the portion 14 is bent upwardly at right angles to form a small flat portion 16. It is this flat portion 16 which is soldered to the back of the ornament 12. The working area is comparatively small and the solder is incorporated therein as shown in Figs. 3, 4, 6 and 7.

The base 10 is formed in an automatic press from sheet stock. First, a blank 17 is cut out in the form of a cross having a portion 18 which forms the flat portion 14 when finished, and side portions 19 having openings 20 which are later bent upwardly to form the ears 15. The invention resides in the handling of the portion 21 which is later bent upwardly to form the soldered portion 16. As can be seen in Figs. 3 and 6, the portion 21 is provided with an opening 22 which is chamfered at 23 at each end. A short length of solder wire 24 is tapered at each end as at 25 and inserted into the opening 21. This can be done automatically in the press. Now when pressure is applied at each end of the solder 24 it will spread into the chamfered portions of the opening and flatten out as shown in Figs. 4 and 7.

The solder 24 is conventionally provided with a core of flux. By tapering each end at 25 the metal will have a tendency to bend inwardly under pressure. This will serve to seal in the flux during the stamping operation. The chamfering serves several purposes. When the solder is spread under pressure into the chamfered portions it will become locked in place. Secondly, it permits the solder to be compressed so that it will not extend substantially beyond the surface of the blank 17. This will permit accurate positioning of the parts before solder. Note that the portion 16 will rest flat against the back of the earring ornament 12. Thirdly, chamfering spreads the solder over a wider area giving more soldering surface. And last, the soldering operation is usually performed with the ornament flat and the base upright. When heat is applied the surface solder will run into the opening because of the chamfer and will not slop over on the outside.

I have thus provided a base for an ear clip in which the solder can be incorporated during the manufacture and assembly operation. The tapering of the solder and chamfering of the opening ensures a uniform well soldered joint at all times. The resultant clip greatly reduces the final cost of the earring. Other advantages of the present invention will be readily apparent to a person skilled in the art.

I claim:

A base member for an earring clip comprising an elongated flat portion stamped from sheet stock and having integral upstanding ears at each side edge, said ears having pivot openings, one end of said flat portion being bent at right angles to form an attaching portion, said attaching portion having a central opening therethrough, and a length of solder wire locked in said central opening, each end of said central opening being chamfered, each end of said length of solder wire being flattened to spread into said chamfered portions.

References Cited in the file of this patent

UNITED STATES PATENTS

| | | |
|---|---|---|
| 513,655 | Schoen | Jan. 30, 1894 |
| 1,936,018 | Hodgson | Nov. 21, 1933 |
| 2,263,166 | Darvie et al. | Nov. 18, 1941 |
| 2,275,438 | Hothersall | Mar. 10, 1942 |
| 2,425,299 | Ballou | Aug. 12, 1947 |
| 2,583,988 | Ballou et al. | Jan. 29, 1952 |
| 2,733,491 | Saccoccio | Feb. 7, 1956 |
| 2,809,501 | Bangs | Oct. 15, 1957 |